Oct. 22, 1946.  J. H. NOOTENS  2,409,951
INSULATING BAT
Filed May 7, 1942    2 Sheets-Sheet 1
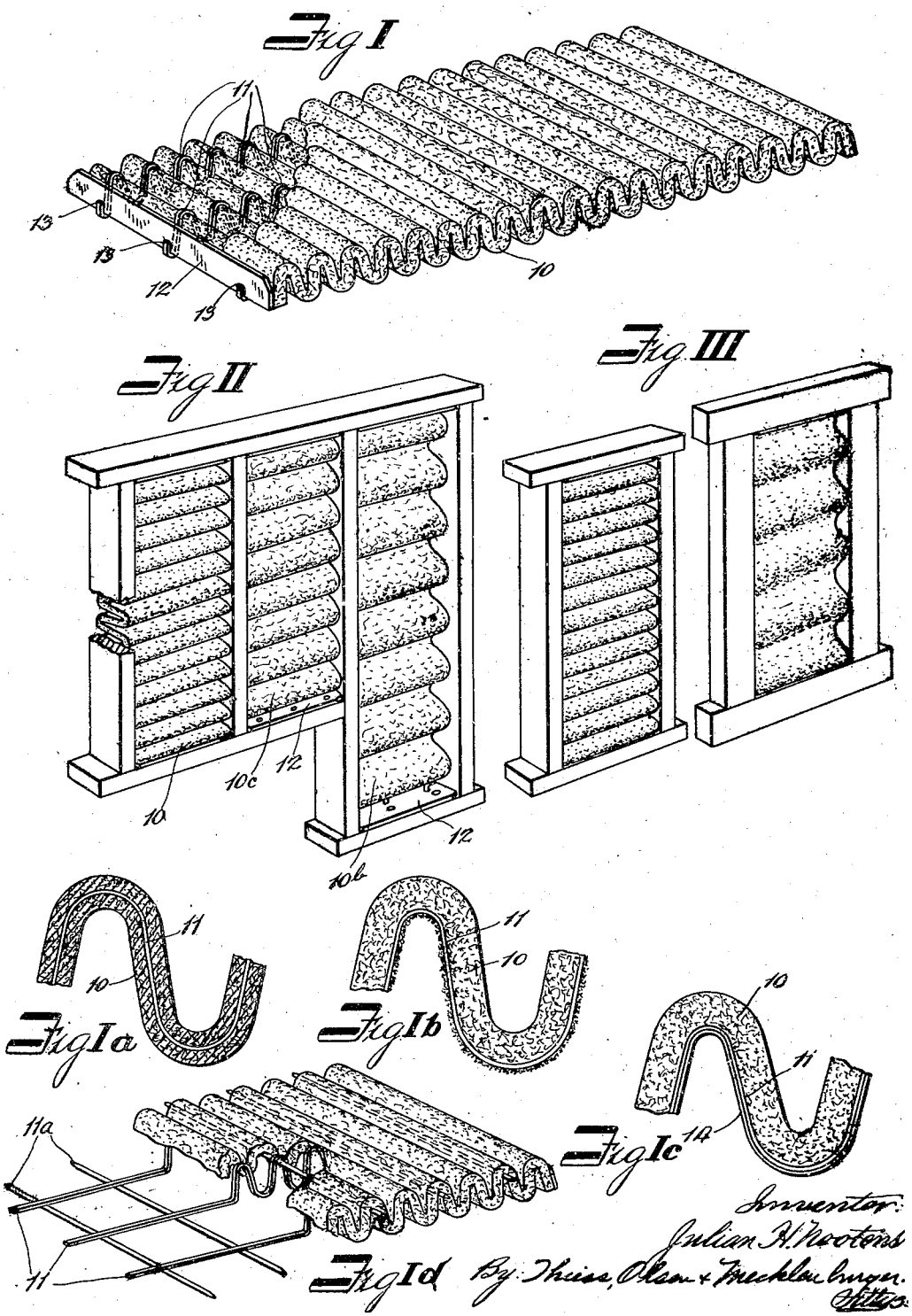

Oct. 22, 1946.  J. H. NOOTENS  2,409,951
INSULATING BAT
Filed May 7, 1942  2 Sheets-Sheet 2
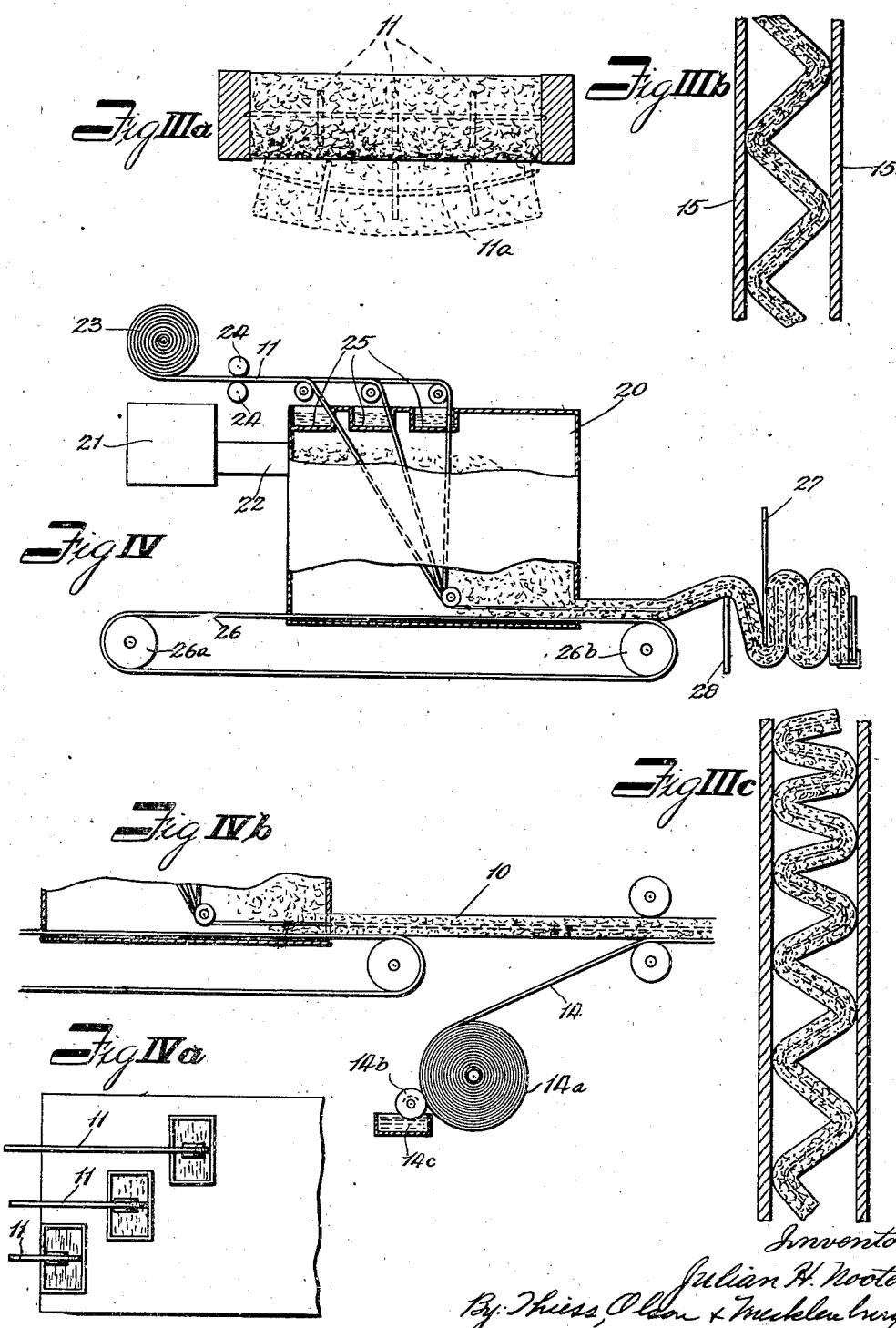

UNITED STATES PATENT OFFICE 2,409,951

INSULATING BAT

Julian H. Nootens, Chicago, Ill., assignor to United States Gypsum Company, Chicago, Ill., a corporation of Illinois Application May 7, 1942, Serial No. 442,095

1 Claim. (Cl. 154—44)

This invention relates to members used for the heat insulation of buildings, the process of manufacturing the same, and one form of apparatus for carrying out the indicated process of making said insulating members or units. Such insulating members are frequently referred to as insulating blankets or bats and are adapted to be arranged, in one use thereof, between the upright studding in building walls and between the joists in the floor, ceiling or roof structure.

Accordingly, the herein described invention also concerns a wall construction in which standard insulating units are so formed that wall spaces to be equipped therewith may be practically and desirably insulated irrespective of variations in the length or thickness of said spaces or in the degree of insulation required in said spaces.

The insulating bats or blankets may be made from a variety of fibrous material such, for instance, as mineral or slag wool, glass wool, cotton, balsam pulp, or other fibrous materials, all of which are of a generally loose or fluffy character and are adapted to be matted or felted together to form a blanket which provides desirable insulating qualities. In forming bats from such materials, it is frequently desirable to make use of binders, among which may be mentioned starch, waxes, drying oils, asphalt, pitches, synthetic resins, and many other similar materials. Insulating bats or blankets are at present manufactured in various thicknesses as required by the wall thickness or space in which the blanket is to be fitted. The material is matted, moreover, in accordance with the amount of insulation required. Finally, insulation bats are made in certain standard lengths best to anticipate the needs of the usual building dimensions.

However, should an unusual dimension be encountered, i. e., one which is not a multiple of some available length of bat, it is, of course, necessary to piece out the space by cutting enough from a standard length bat to fill out the length of the space to be insulated. Again, if it is desired substantially to fill a space of unusual thickness, either a plurality of thicknesses of standard bat must be jammed into the out-size thickness space or, if the latter is of less thickness than usual, more material is used than required. Finally, it has been practically impossible simply and expeditiously, when using standard units, to vary the amount of insulation in a given space.

The ability to vary the differential distribution of the insulation in an intrawall space is another advantage which may be obtained when using the herein described insulating bat, and accordingly a wall construction embodying such differential distribution of insulation material is another herein described and claimed feature. Because the warm air in a room rises and therefore accumulates at or near the ceiling level, it may be desired differentially to distribute the insulation to take care of the heat concentration at the ceiling height. Moreover, the temperatures at lower levels in the same room are in progressively decreasing degrees lower than at the ceiling level. One of the wall constructions made possible by the use of the improved bat herein described recognizes the existence of differing temperatures at various levels in a room and provides insulation varying in accordance therewith.

This invention accordingly has for its object to provide a reenforced corrugated or extensible insulation bat or blanket that can be adapted, within reasonable limits, to spaces of varying lengths and thicknesses including the method of, and an apparatus for, producing such a bat; moreover, the invention contemplates an improved method of wall construction in which the aforesaid bat is an important element.

In addition to the many constructional advantages flowing from the provision of the aforesaid bat, a further advantage resides in this—the bats may be compressed in appreciably smaller cubic space within a carton for purposes of shipment than has heretofore been possible; yet when removed from the shipping cartons, they (the bats) can be readily expanded to the originally intended size.

An important part of the invention consists in matting or felting the loose or fluffy material in association with a reenforcing member of such character as to make the mineral wool portion of the bat substantially self-sustaining in a variety of extensible forms. The reenforcing may be disposed internally of the wool portion or may be positioned near or on the surface of the wool portion, it being understood that the reenforcing means is itself sufficiently flexible to be extensible or compressible as the bat is extended or compressed. Such reenforcement may be in the form of stiffening strips of metal, plastic or other materials, or it is within the scope of the invention to utilize a lightweight woven or expanded metal mesh or a metal sheet as a reenforcing and holding member.

Inasmuch as no one has heretofore proposed the formation of insulating members as herein described and/or the use thereof as hereafter set forth, it must immediately be understood that the mere presence of paper or similar vapor seal material on the surface of a corrugated member does not satisfy the necessities of the present invention, i. e., the bat must be reenforced in such manner that it is entirely self-sustaining and may be positioned as hereinafter set forth. Accordingly, it must be emphasized that while one effective means of combining the reenforcing members with the insulating bat is to internally dispose such members, nevertheless it is also within the scope of the present disclosure to position such reenforcing members on or near one or the other of the outside surfaces of the bat; in the following description of the method of forming the new bat, this idea of placing the reenforcing members on or near the outside of the bat is described. Again, the reenforcing means may be placed between the bat and any vapor seal barrier which may be secured to the outside of the bat. Such vapor seal barrier may be paper and in such case the renforcement will then be placed between the paper seal and the mineral wool portion of the bat.

Accordingly, while mineral wool intended to be utilized for insulating purposes may have heretofore been corrugated, there has never been any appreciation that it should be reenforced and corrugated to be self-sustaining as and for the purposes herein described.

When the blanket is reenforced as indicated, it will not sag after being disposed in the building wall and will be much more resistant to compression than the bats now in use. Moreover, the reenforcing means assists in maintaining the bat uniform in thickness and insures that it will remain in place for many years without undergoing the shrinking which is now sometimes encountered.

In addition to other advantages herein specified, the present invention permits the formation, between wall studs, of a plurality of dead air spaces. Such dead air spaces are recognized as having high and effective heat insulation value. In the hereinafter described drawings, it will be seen that when a corrugated bat is placed between wall studs the apices of the corrugations will touch the two opposed wall surfaces and thus effectively create a plurality of dead air spaces. These air spaces can, moreover, be varied as to effectiveness in accordance with the heat insulation which is required at the differing temperature levels in the room being insulated; if the convolutions are arranged close together at one point but spaced apart at another point in the intrawall space, the dead air spaces are desirably varied in effectiveness.

As hereinbefore suggested, it is intended here to disclose as component parts of this invention the product itself, the process of forming the product, an illustrative machine which may be used in following out the indicated process, the method of constructing a novel insulated wall structure, and the wall structure itself. Accordingly, other objects and advantages of the invention will appear from a consideration of the following detailed specification.

Moreover, the recital of the foregoing objects or statements of the invention is not intended to limit the inventive disclosure of the drawings. The latter are to be taken as the most fully informatory source of what applicant's invention comprises. Accordingly, any and all novel features and/or combinations of features which are disclosed herein (the word "disclosed" being used as distinguished from "stated" or "claimed")— either in the drawings and/or in the specification and/or in the claim or claims (may be in any one of the three sections of the application to the exclusion of the other two)—whether or not specified as new and/or comprising part of the invention and which were unknown before applicant entered the field, are applicant's invention.

In short, everything in the drawings is new unless it shall be found to have been known heretofore. Moreover, irrespective of whether or not all of the elements, or combinations thereof, shown in the drawings or described in the specification or claimed in the claim are asserted to be new, it is intended that the mere disclosure of these elements, and/or any combinations thereof, constitutes a claim of invention to every element and combination not known before applicant's contribution.

Therefore, any and all combinations disclosed in any one or more of the three parts of this application may be claimed originally or at any future time. The necessity of claiming at some future time what is not now specifically designated as applicant's invention may arise because others may claim what applicant has here disclosed but in language not now anticipated as definitory by applicant. Accordingly, future drafted claims may be required properly to protect applicant because he cannot now anticipate the variations of language which others may deem descriptive of some element or combination of elements shown in applicant's drawings.

Again, something fully disclosed by applicant may be unwarrantedly asserted not to have upon the filing hereof been stated to be an invention. Since, however, it is above pointed out that everything in the disclosure not heretofore known is applicant's invention, right is reserved to hereafter assert claims to all material herein described.

Finally, even if an element, or combinations of elements, are herein described as performing only one purpose, applicant's invention covers and provides for any and all other and/or additional purposes which any structure of the drawings may hereafter be found to fulfill or be described as fulfilling. It is accordingly intended hereby to designate as applicant's invention all purposes or uses thereof, and the right is reserved to add claims setting forth such purposes at any time prior to issue so long as the subject matter of such claims are disclosed upon filing.

The purpose of these reservations is to eliminate forthrightly any assumption—by anyone or by any tribunal or by any court hereafter speculating concerning what inventions may be disclosed in this application—that every element and/or combination of elements disclosed in this application is not intended to be asserted as applicant's invention.

Accordingly, for a more complete understanding of the invention, reference is made to the accompanying drawings, in which Figure I illustrates in perspective an insulation bat or blanket embodying the present invention, the reenforcement thereof being shown as comprising three strips of internally-disposed material, although it is understood that, if desired, a sheet of lightweight metal, for instance metal mesh, may be incorporated with the bats instead of metal strip to provide reenforcement therefor.

Fig. Ia is a fragmentary enlarged elevational sectional view of a portion of the bat of Fig. I showing the manner in which an internally disposed reenforcing strip appears when it is incorporated with the bat.

Fig. Ib is a similar fragmentary view showing the manner in which the reenforcing means appears when the latter is placed near, or on, the surface of the bat.

Fig. Ic is a similar fragmentary view illustrating the reenforcing means positioned on the outside of the bat but between the mineral wool material thereof and a vapor seal or paper cover which may be adhered to the bat.

Fig. Id is a fragmentary view of a bat as shown in Fig. I wherein transverse strips are added to the reenforcing means, it being observed that these strips may, if desired, extend beyond the side margins of the bat and that these transverse members are intended to be slightly flexible so that when the ends thereof are sharpened or are provided with teeth they (the transverse members) may be secured in place by being bowed and/or stuck into the wood uprights—as shown in a hereinafter-referred-to view—thereby to fix the bat permanently in relation to the wall.

Fig. II is a perspective view illustrating the manner in which any of the aforementioned bats may be disposed between adjacent wall studs, this showing being illustrative of the manner in which the same sized bat may be utilized in filling spaces of unequal linear dimensions.

Fig. III is a view similar to Fig. II but illustrates the manner in which the same sized bat may be used to fill—from face to face—spaces of the same linear dimension but in walls of different thicknesses.

Fig. IIIa is a plan sectional view showing the manner in which a bat provided with transversely extending reenforcing means is secured between the upright studs in a wall space, it being noted that—in order to slip the bat into position (a bat being illustrated both before and after positioning)—the transverse members are slightly bowed and the ends of the latter are stuck into, or grab, the wood of the uprights, thereby assisting in preventing sagging of the bat and insuring that the latter will remain in the position in which it is originally placed.

Fig. IIIb is a fragmentary elevational sectional view illustrating the manner in which a bat—when so placed that the apices of the corrugations therein touch opposite wall surfaces—comprehends a plurality of effective heat insulating dead air spaces.

Fig. IIIc is an elevational sectional view illustrating the manner in which a bat, the apices of whose corrugations touch opposite wall surfaces of the intrawall space, may be arranged to provide differential distribution of insulation material in the intrawall stud spaces as dictated by the temperatures of the different heat levels in the space being insulated.

Fig. IV is a schematic showing in elevational partial section of apparatus for forming the bat embodying the hereinbefore described invention, it being understood that this is only one machine which can be used to carry out the hereinafter claimed process of manufacturing the insulation bat incorporating the invention.

Fig. IVa is a top view of the wool room of Fig. IV illustrating the staggered manner in which three strips 11 are fed into the top of said room.

Fig. IVb is a fragmentary elevational sectional view of a modification of the apparatus shown in Fig. IV.

Referring now more particularly to Fig. I, the bat comprises a body of loose or fluffy material 10 which has been so matted or felted about internally-disposed reenforcing members 11—11—11 and which has been so formed as to present a corrugated appearance. As heretofore indicated, the reenforcing members may be of light metal, stiff paper (treated or untreated), vulcanized fiber, elastic plastic or similar materials. Moreover, it is to be understood that the reenforcing member may comprise a light sheet of metal such, for instance, as lightweight metal mesh. Insulating bats embodying the present invention are definitely more flexible and accommodable in use than previously known products suggested for similar purposes.

In Figs. Ib and Ic the heretofore described longitudinal strip reenforcements are shown as having been so combined with the mineral wool bat that the reenforcing means are, in effect, externally disposed with respect to the main portion of the bat material. This can be accomplished by feeding the reenforcing material in such a way into the room in which the fibers are received that the material is properly proportioned and that they (the reenforcing means) are so associated with the main body of fibers that the latter does not surround the reenforcing means as in the previously described bat. Of course, adhesive may be used on the reenforcing means, or such adhesive as may be supplied by the binder of the bat itself may be taken advantage of to secure the desired adhesion between the reenforcing means and the fibers. Again, as shown particularly in Fig. Ic, externally disposed reenforcing means may be positioned between the mineral wool portion of the bat and any vapor seal barrier 14 that may be used—for instance, a paper vapor seal barrier—it being intended that all of these variations are to be read as within the scope of the appended claim.

The manner in which transversely extending bars or tying rods 11a are associated with the longitudinally extending reenforcing strips 11 is shown in Fig. Id. Such cross members impart additional structural rigidity to the bat and enable the latter to be more easily handled. The transversely extending reenforcing means 11a are either secured to the strips 11 (whether the latter are internally or externally disposed) in which case they (the rods 11a) comprise tying rods for the general reenforcing structure, or these transverse members 11a may be separately incorporated with the mineral wool portion of the bat (in the latter case they might be disposed on, or near, the surface of the bat while the longitudinal strips are internally disposed, or vice versa). Again, said rods 11a may—either when incorporated independently of the strips 11 or when attached to the latter—be held between a vapor seal barrier such as 14 and the body 10 of the bat.

These reenforcing means may, if desired, be made slightly longer in dimension than the transverse space between the two upright studs defining the space into which the bat is to be placed. Accordingly, it may be necessary slightly to bow the transversely extending means to place the bat in position. Such bowing of these rods will readily secure the bat in the position in which it is initially placed, and if it is found desirable, the ends of the transversely extending reenforcing means may be sharpened so that they will more readily stick into, or grab, the wood uprights.

In Fig. II the studs and top and bottom plates of a wall structure are somewhat schematically shown, it being noted that the linear dimension of the space between the two left-hand studs is considerably shorter than the space between the two right-hand studs. This situation would be encountered, for instance, if a window or other similar opening existed in the wall at the left. Nevertheless standard bats of the present invention may be so disposed as satisfactorily to fill both linear spaces. The left-hand space being much the shorter has been filled without extending or pulling out the corrugations of bat 10.

One desirable method of installing such a bat has been indicated by illustrating an end plate 12 provided with openings 13 in which latter the hooked ends of the reenforced strips are positioned. After nailing one of the end plates in place, the bat is drawn down and the other plate is nailed to the bottom of the space. As indicated, the linear space between the two left-hand studs in Fig. II is about as long as the standard bat here being described. No extension of bat 10 is therefore necessary.

However, in order to accommodate the same size bat to the longer space between the two right-hand studs, it will be noted that bat 10b has been considerably extended. This may be accomplished by nailing the top end plate in place and then carefully extending the convolutions and nailing the bottom end plate after the bat has been sufficiently extended completely to fill the linear space indicated.

The central space in the schematic wall of Fig. II is insulated by bat 10c, this variation being illustrated to emphasize that an insulating bat of the present invention may be adjusted to provide varying degrees of insulation. When the standard bat is extended as shown at 10c, the total amount of material in a given space will be decreased and the insulation value of the bat correspondingly varied. However, this is one of the advantages obtained by using the herein described bat and should be borne in mind in reading the appended claim.

From another point of view, the heretofore-explained corrugation of the bat is of distinct advantage. In Fig. III the two studs at the left are intended to illustrate a wall of a thickness substantially equal to the distance from the ridge of one convolution to the ridge of the next neighboring convolution before the bat is pulled out, i. e., when the latter is in a substantially normal and unextended condition. The two studs at the right of Fig. III, however, illustrate a possibility which may be encountered, i. e., where the thickness of the space to be filled is considerably less than that illustrated at the left of Fig. III. Under these conditions, by extending the convolutions of the bat, optimum use is made thereof, i. e., the bat is reduced in thickness to fit snugly into the decreased thickness of the space indicated. True, if the linear dimensions of the two spaces of unequal thickness are the same, it will be necessary to cut off that extending portion of the bat formed by decreasing the thickness of the bat as indicated at the right of Fig. III.

In Fig. IIIa is shown a plan sectional view of two uprights between which a bat having the transverse tie rods 11a has been positioned, the manner in which such rods 11a must—prior to installation—be bowed being shown in dotted sectional view of the bat, the latter, of course, being the position of the bat before being slipped into place between the upright studs.

The elevational sectional view of Fig. IIIb illustrates the manner in which desirable dead air spaces are provided when a bat of the constructions here disclosed is so placed between intrawall surfaces 15 and 15a that the apices of the corrugations touch the two opposed wall surfaces. Bats which do not include the invention set forth herein will not satisfactorily eventuate this dead air space structure for the reason that, even though they promise to fulfill the builder's desire in this respect when first installed, they will in time sag and it is then too late to restore them in original position. On the other hand, bats having the reenforcements proposed herein are constant in position and insure the existence of the desirable insulating dead air spaces throughout the life of the structure in which the bats are incorporated.

By reference to Fig. IIIc it will be understood how the herein described insulating bat can be arranged in the intrawall stud space to obtain a differential distribution of heat insulation, remembering that there may be a concentration of heated air at the ceiling height level and that this concentration decreases as the height from the floor decreases. The bat is arranged in the space shown with the convolutions close together near the top of the space, i. e., near the ceiling and with those convolutions being gradually pulled out to greater and greater extent as the height from the floor decreases.

Under normal circumstances the reenforcement in the bat is sufficient to hold the convolutions of the latter in whatever extended position in which those convolutions are originally placed in the intrawall space between adjacent studs, this being particularly true when the bat is of normal commercial weight. If, however, it is desired further to insure that the convolutions will remain in the originally disposed position, i. e., that they will not sag from whatever extended position in which they are placed to secure the herein recited advantages, the frictional engagement of the sides of the bat with the studs bounding the sides of the intrawall space (occurring when the bat is pushed into position between the studs) can be invoked to hold the bat in position. Furthermore, most commercial bats have a flap at the sides thereof and this flap can be secured to the studs if conditions dictate. Finally, other securing means can be employed if it appears that unusual conditions may cause the bat convolutions to sag after they have been originally disposed in a predetermined desired position.

This arrangement not only gradually decreases in thickness the amount of insulation per unit space from the ceiling to the floor level but also results in a desirable variation in distribution of the dead air spaces between the studs. By so utilizing the herein described insulating bat, a novel and highly advantageous wall construction ensues. Economies are thus obtained not only by so using the insulating material most efficiently—as dictated by the heat levels in the interior space—but also in the results that are obtained in the actual construction.

Broadly speaking, it is intended that a bat of the character above described shall be manufactured by forming or matting the fluffy material around, or in combination with, one or more reenforcing members. This process in one of its desirable forms is illustrated in connection with Fig. IV.

The reenforcing members such as 11 are progressed through a chamber 20 (sometimes designated as the wool room), the fluffy material being blown into chamber 20 from a material reservoir 21 through a nozzle 22. If the material to be used is mineral wool, the aforesaid nozzle 22 may exit from a mineral melting cupola and a steam blowing nozzle which breaks down the melt, thereby to cause fine threads resembling wool to pass out of the nozzle 22 and into the chamber 20.

The wire or other reenforcing members are uncoiled from rolls 23 and passed through flattening and/or progressing rolls 24—24. It may be desirable to apply adhesive to the reenforcing members, thereby to insure that the mineral wool or other fluffy material will adhere more securely thereabout. Accordingly, adhesive applying stations are diagrammatically shown at 25—25—25. The supply of fluffy material to the chamber 20 is so regulated with respect to the speed of progression of the reenforcing members therethrough that the fluffy material is distributed equally above and below the reenforcing members, as shown at the right of chamber 20.

There is a distinct technique necessary in forming the bat with the reenforcing members correctly disposed with respect to the mineral wool portion of the bat. For this reason among others it must not be overlooked that the invention resides in the manner of forming the bat and the apparatus usable therein as well as in the product produced. It is necessary, for instance, to feed the reenforcing members into that room into which the mineral wool fibers are blown in such a way that the fibers will properly group themselves with respect to the reenforcing members; this presents a problem which is unique and the solution of which is covered by the appended claim. When fibers are blown into the confined space, it is necessary to prevent the longer of the fibers from so disposing themselves transversely across the reenforcing means as to form a barrier or net and thereby prevent the desired uniform deposition of the shorter fibers around the reenforcing means. Because of this, it has been necessary to evolve a method of manufacture which would prevent such contingency, particularly since one desirable reenforcing means comprises flexible metal strips upon which the long fibers have a tendency to fall transversely and thus form the net heretofore referred to. In order to overcome this condition, the method of forming the bat comprehends certain steps to insure the desired result, and the apparatus herein described for carrying out this process, although forming but one means whereby the steps may be performed and in part only schematically shown, is nevertheless in itself unique and susceptible of claimed protection.

Accordingly, the process will be described in connection with the machine used for carrying out the same and it will be understood that neither depends upon the other and that the process and machine are distinct inventive concepts. In order properly to meet the requirements, the mineral wool is blown into an enclosed chamber. The reenforcing means are fed (as an example, when three such reenforcing means are incorporated with the bat) from the top of the chamber in such staggered relation that the fibers will not be unduly impeded in their normal deposition about these reenforcing means.

Accordingly, the three strips shown as providing the reenforcing means are illustrated as being fed into the top of the chamber 20 and are so staggered or set progressively forward of the point of ingress of the wool fibers that the abovementioned screen effect (which might be encountered if the three strips defined a plane extending transversely of the chamber) is eliminated. When the strips are so fed into the wool room or chamber 20, the wool fibers are found to be associable with the strips in the desired manner before being passed out of the room in question.

At the bottom of the wool chamber 20 a belt 26 is fed forwardly of and within the chamber by rollers 26a and 26b, thereby to provide a forwardly moving surface extending completely across the bottom of the chamber 20 and upon which the wool fibers fall. This movable surface or belt 26 is progressed to the right (referring to Fig. IV) at the same speed as are the strips 11, with the result that a properly formed bat exits from the chamber 20 as shown at the lower righthand thereof. If the transverse strips are to be used in the reenforcing means, they may be added either before or after the bat exits from the room 20.

As the fluffy material matted around the reenforcing members exits from chamber 20, a corrugating device—diagrammatically indicated at 27—28—operates upon the matted reenforced material to form it into the product shown in Fig. I. The corrugating means as here illustrated comprises reciprocating flat plates 27—28 which are so timed in movement that the corrugation will be formed as indicated, the relative motion between plates 27—28 being such that one of them holds a last corrugation in place while the next plate is forming the following corrugation. Any desired means of imparting the proper forward motion to the corrugated strip may be employed, i. e., so that a new area is corrugated each time.

While the reenforcing strips have been illustrated in Fig. IV as entering the blowing room from above thereby to insure that the heretofore explained undesired deposition of the raw fibers upon the strips will be prevented, it will nevertheless be realized that the reenforcing means may enter through other walls of the blowing chamber and the direction thereof changed as desired so that the above desirable conditions will be insured. It is not deemed necessary to show this variation in a drawing, but it will be understood that the claim is to be so read that the latter specified method and apparatus will be therewithin, it being applicant's intention that the last-mentioned alternative should not fall without the practical scope of the present invention and/or of the claim defining the same.

If it is desired to apply a vapor barrier to the bats, asphalt-coated paper backing may be utilized; this may be adhered to the wool mass before corrugating, thereby to insure that the same will remain in place as the corrugations are stretched as hereinbefore described.

One means of securing such a vapor barrier is shown in Fig. IVb wherein the paper 14 is fed from a roll 14a and against an adhesive applying member 14b extending partially into adhesive containing box 14c.

From the foregoing description of the novel insulating bat and the manner in which it can be utilized in filling wall spaces, it will be apparent that one of the important features thereof lies in the fact that only one thickness of the material need be manufactured to meet a variety of erecting conditions. It is at present necessary to manufacture several thicknesses to anticipate the various conditions which may be met with in the construction field; for instance, it is now ordinary to find bats of one-inch in thickness and others of three-inches in thickness.

However, by reason of the present invention, a blanket of one-inch in thickness may be manufactured and then corrugated to eventuate a bat having in fact a possible thickness of four (4) inches and as hereinbefore explained such a bat would permit the user thereof satisfactorily to fill all intrawall spaces between the one-inch and four-inch dimensions. Thus a readily available and very flexible material adaptable to the various intrawall spaces which may be met with on various jobs is provided.

This not only is an advantage to the erector—who need not concern himself with the precise thickness of the wall space he must fill (assuming of course that such spaces are known to be within the limits hereinafter set forth)—but it is always of marked advantage to the manufacturers and wholesalers who need only make and stock one standard material in order to meet all of the requirements in the ordinary job.

It is not intended that the description heretofore given of the invention or the showing thereof set forth in the drawings is limiting in any respect the monopoly herein claimed by applicant. It is on the contrary intended that all claims hereinafter allowed, whether made initially herein or to be hereinafter added (assuming that they are properly supportable by the drawings or specification or claims originally made herein), shall measure the scope of the invention herein set forth. Accordingly and with the foregoing in mind, what is claimed as new and is desired to be secured by Letters Patent is:

An insulating member formed with corrugated convolutions to permit extensibility thereof throughout the limits imposed by the longitudinal stretched-out length thereof on one hand and the telescoped longitudinal dimension thereof on the other, and having foraminous reinforcing means incorporated therein, the transverse members of said reinforcing means being longer than the width of the insulating member and being of springable material to permit their being bent and sprung into engagement to support said insulating member between two boundary members.

JULIAN H. NOOTENS.